United States Patent
Sugihara

(10) Patent No.: US 9,115,673 B2
(45) Date of Patent: Aug. 25, 2015

(54) CONTROL DEVICE FOR INTERNAL COMBUSTION ENGINE

(75) Inventor: Hiroyuki Sugihara, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 13/822,540

(22) PCT Filed: Feb. 1, 2012

(86) PCT No.: PCT/JP2012/052258
§ 371 (c)(1),
(2), (4) Date: Mar. 12, 2013

(87) PCT Pub. No.: WO2013/114585
PCT Pub. Date: Aug. 8, 2013

(65) Prior Publication Data
US 2014/0338326 A1 Nov. 20, 2014

(51) Int. Cl.
*F01N 3/00* (2006.01)
*F02M 25/07* (2006.01)
(Continued)

(52) U.S. Cl.
CPC .............. *F02M 25/077* (2013.01); *F01N 3/20* (2013.01); *F02D 41/024* (2013.01); *F02B 29/0437* (2013.01); *F02D 41/0007* (2013.01); *F02D 41/22* (2013.01); *F02D 2200/0802* (2013.01); *F02D 2200/1015* (2013.01); *F02M 25/0707* (2013.01); *F02M 25/0718* (2013.01); *Y02T 10/26* (2013.01)

(58) Field of Classification Search
CPC ............ F02M 25/077; F02M 25/0437; F02M 25/0707; F02M 25/0718; F01N 3/20; F02D 41/024; F02D 41/22; F02D 41/0007; F02D 2200/1015; F02D 2200/0802; F02B 37/18

USPC .................. 123/406.26, 406.29, 406.47, 564; 701/111; 60/601, 286, 277, 274, 276
See application file for complete search history.

(56) References Cited

U.S. PATENT DOCUMENTS

| 5,485,374 A * | 1/1996 | Takaku et al. ................ 701/31.6 |
| 8,516,799 B2 * | 8/2013 | Hepburn et al. ................ 60/286 |
| 2011/0246049 A1 * | 10/2011 | Matsuo et al. ................ 701/111 |

FOREIGN PATENT DOCUMENTS

| JP | 61 244831 | 10/1986 |
| JP | 11 50878 | 2/1999 |
| JP | 2006 46140 | 2/2006 |

Primary Examiner — Audrey K Bradley
Assistant Examiner — Kelsey Stanek
(74) Attorney, Agent, or Firm — Oblon, McClelland, Maier & Neustadt, L.L.P.

(57) ABSTRACT

An internal combustion engine control device that acquires the temperature of a catalyst disposed in an exhaust path, and detects an abnormal combustion that has occurred in a combustion chamber. The control device includes a gas control unit, which controls the amount of intake gas flowing into the combustion chamber and the temperature of exhaust gas flowing into the catalyst, and a fuel injection amount control unit, which controls the amount of fuel injected into the combustion chamber. The control device also includes an abnormal combustion inhibition mode selection unit that chooses a first mode, a second mode, or a third mode in accordance with the catalyst temperature when the abnormal combustion is detected. The first mode causes the gas control unit to suppress the occurrence of the abnormal combustion while raising the catalyst temperature. The second mode causes the fuel injection amount control unit to suppress the occurrence of the abnormal combustion while inhibiting an increase in the catalyst temperature. The third mode causes the gas control unit and the fuel injection amount control unit to suppress the occurrence of the abnormal combustion.

9 Claims, 11 Drawing Sheets

(51) Int. Cl.
*F02D 41/02* (2006.01)
*F01N 3/20* (2006.01)
*F02D 41/22* (2006.01)
*F02B 29/04* (2006.01)
*F02D 41/00* (2006.01)

S100: AN ABNORMAL COMBUSTION HAS OCCURRED?
S110: THE CATALYST WARM-UP IS COMPLETED?
S120: OPEN THE THROTTLE VALVE, AND OPEN THE WGV
S130: A THRESHOLD VALUE ≦ THE CATALYST TEMPERATURE?
S140: INCREASE THE FUEL INJECTION AMOUNT CORRECTIVELY
S150: OPEN THE THROTTLE VALVE, OPEN THE WGV, AND INCREASE THE FUEL INJECTION AMOUNT CORRECTIVELY
S160: AN ABNORMAL COMBUSTION INDEX ≦ A THRESHOLD VALUE?

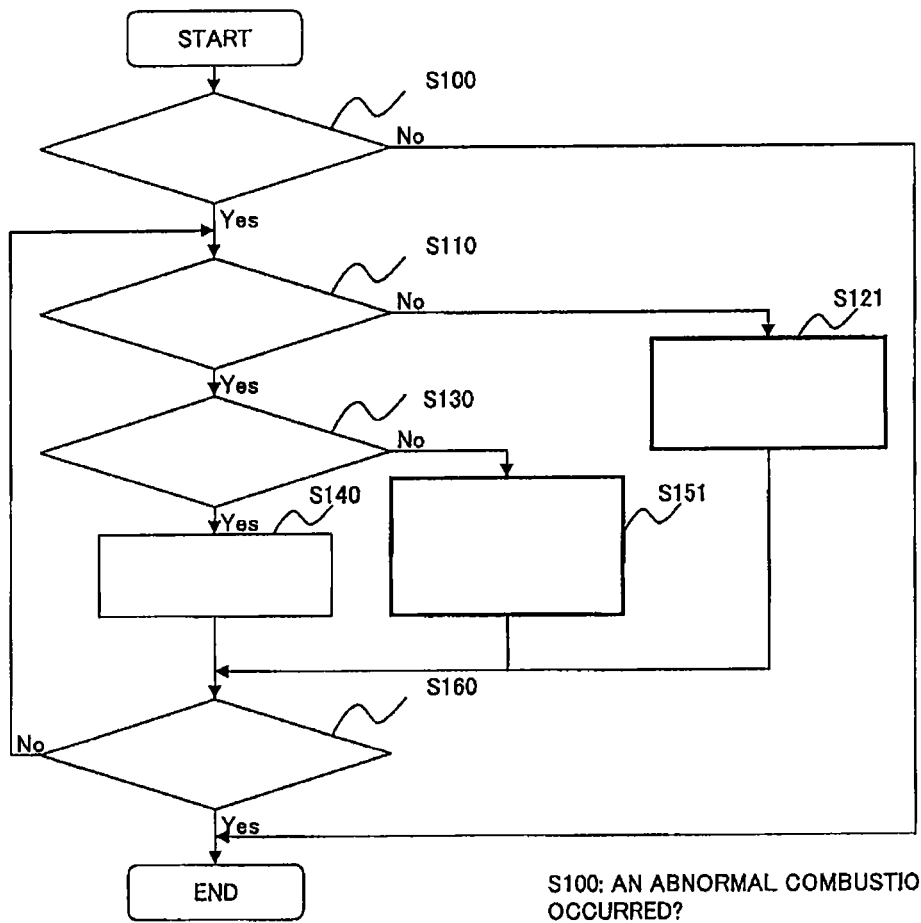

FIG. 5

S100: AN ABNORMAL COMBUSTION HAS OCCURRED?
S110: THE CATALYST WARM-UP IS COMPLETED?
S121: OPEN THE THROTTLE VALVE, OPEN THE WGV, AND RETARD THE IGNITION TIMING
S130: A THRESHOLD VALUE ≦ THE CATALYST TEMPERATURE ?
S140: INCREASE THE FUEL INJECTION AMOUNT CORRECTIVELY
S151: OPEN THE THROTTLE VALVE, OPEN THE WGV, INCREASE THE FUEL INJECTION AMOUNT CORRECTIVELY, AND RETARD THE IGNITION TIMING
S160: AN ABNORMAL COMBUSTION INDEX ≦ A THRESHOLD VALUE ?

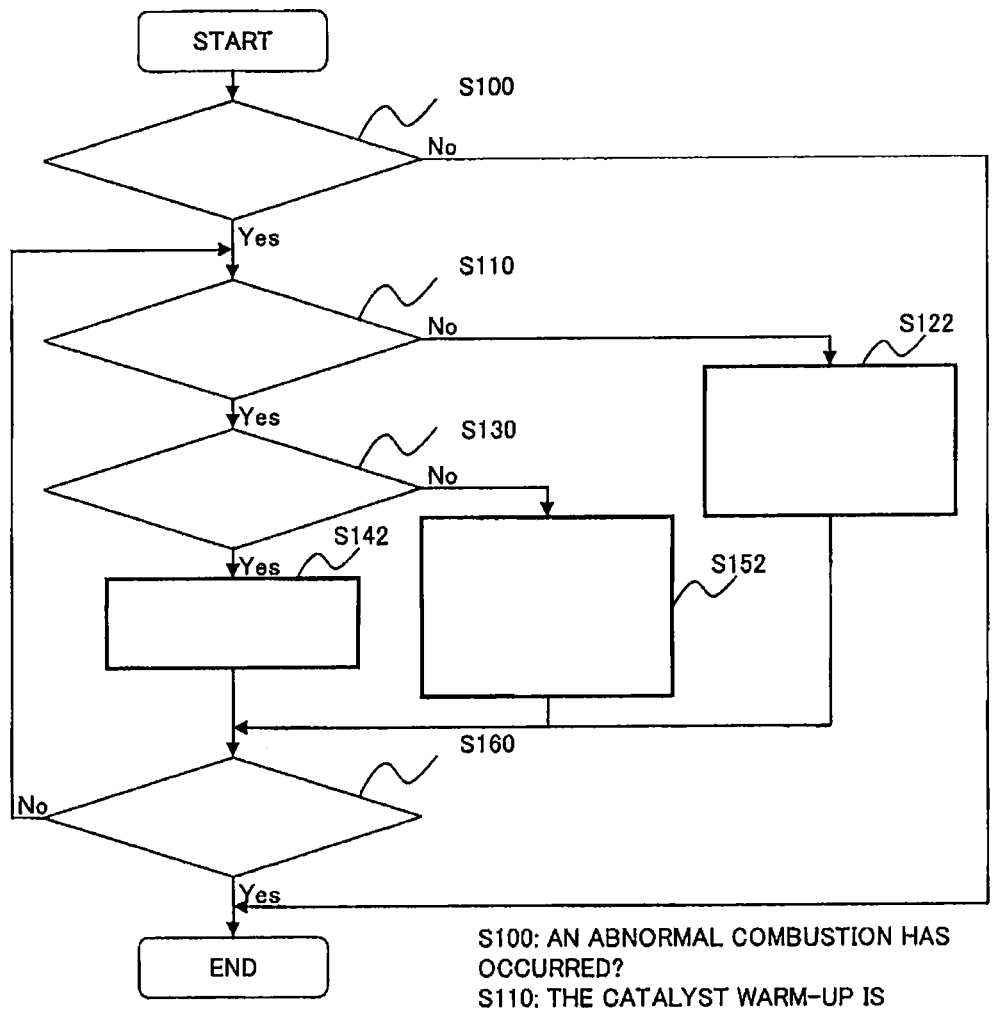

FIG. 7

S100: AN ABNORMAL COMBUSTION HAS OCCURRED?
S110: THE CATALYST WARM-UP IS COMPLETED?
S122: OPEN THE THROTTLE VALVE, OPEN THE WGV, RETARD THE IGNITION TIMING, AND INCREASE A VALVE OVERLAP AMOUNT
S130: A THRESHOLD VALUE ≦ THE CATALYST TEMPERATURE?
S142: INCREASE THE FUEL INJECTION AMOUNT CORRECTIVELY, AND INCREASE A COOLING EFFICIENCY
S152: OPEN THE THROTTLE VALVE, OPEN THE WGV, INCREASE THE FUEL INJECTION AMOUNT CORRECTIVELY, RETARD THE IGNITION TIMING, AND INCREASE A VALVE OVERLAP AMOUNT
S160: AN ABNORMAL COMBUSTION INDEX ≦ A THRESHOLD VALUE?

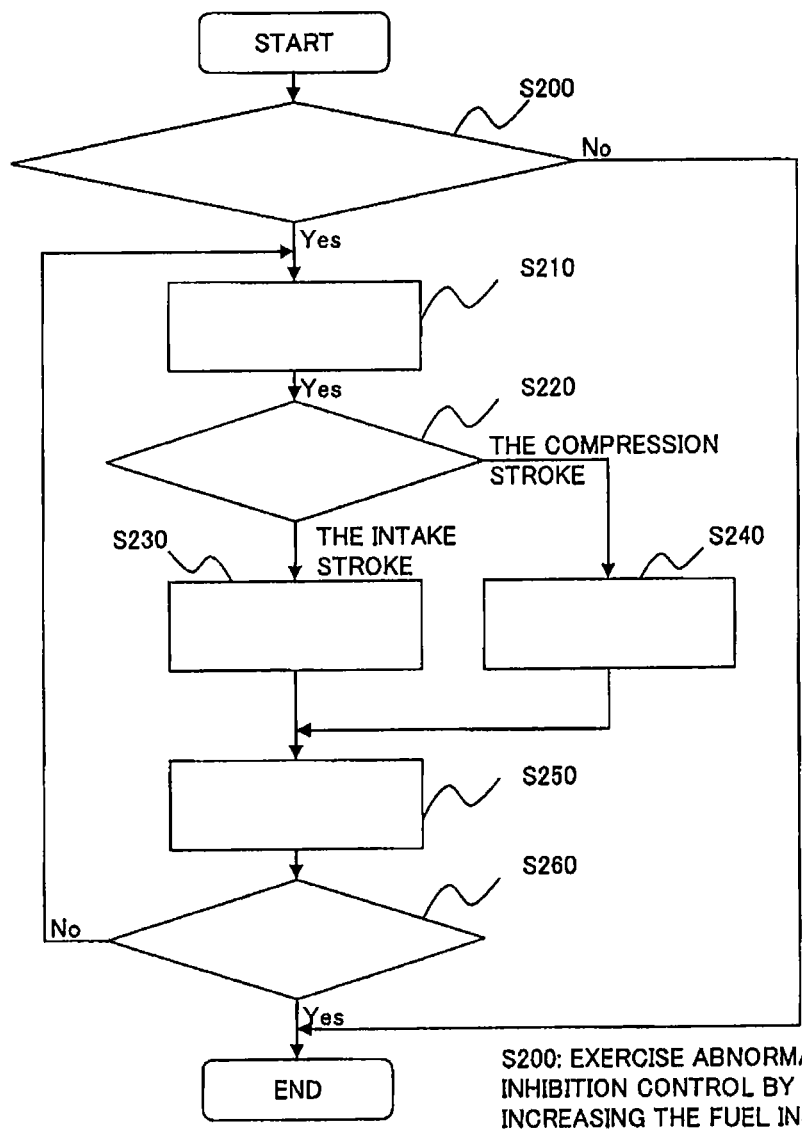

FIG. 8

S200: EXERCISE ABNORMAL COMBUSTION INHIBITION CONTROL BY CORRECTIVELY? INCREASING THE FUEL INJECTION AMOUNT?
S210: ACQUIRE AN INCREASE VALUE OF THE FUEL INJECTION AMOUNT
S220: JUDGE THE FUEL INJECTION TIMING
S230: CALCULATE AN AMOUNT BY WHICH AN INJECTION END TIMING IS TO BE RETARDED
S240: CALCULATE AN AMOUNT BY WHICH AN INJECTION START TIMING IS TO BE ADVANCED
S250: INJECT THE FUEL
S260: AN ABNORMAL COMBUSTION INDEX ≦ A THRESHOLD VALUE?

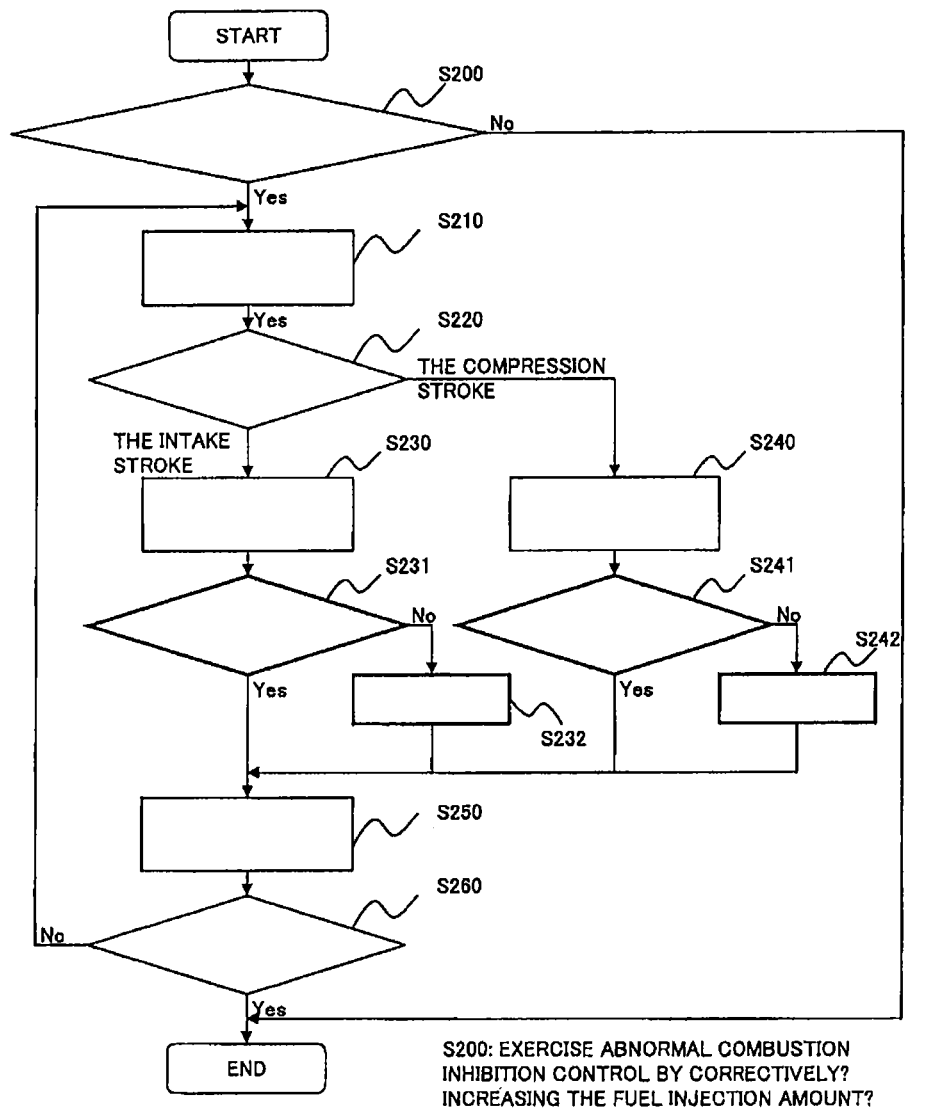

FIG. 9
S200: EXERCISE ABNORMAL COMBUSTION INHIBITION CONTROL BY CORRECTIVELY? INCREASING THE FUEL INJECTION AMOUNT?
S210: ACQUIRE AN INCREASE VALUE OF THE FUEL INJECTION AMOUNT
S220: JUDGE THE FUEL INJECTION TIMING
S230: CALCULATE AN AMOUNT BY WHICH AN INJECTION END TIMING IS TO BE RETARDED
S231: CAN THE INJECTION BE COMPLETED AT A NORMAL FUEL PRESSURE?
S232: CALCULATE A REQUIRED FUEL PRESSURE
S240: CALCULATE AN AMOUNT BY WHICH AN INJECTION START TIMING IS TO BE ADVANCED
S241: CAN THE INJECTION BE COMPLETED AT A NORMAL FUEL PRESSURE?
S242: CALCULATE A REQUIRED FUEL PRESSURE
S250: INJECT THE FUEL
S260: AN ABNORMAL COMBUSTION INDEX $\leq$ A THRESHOLD VALUE?

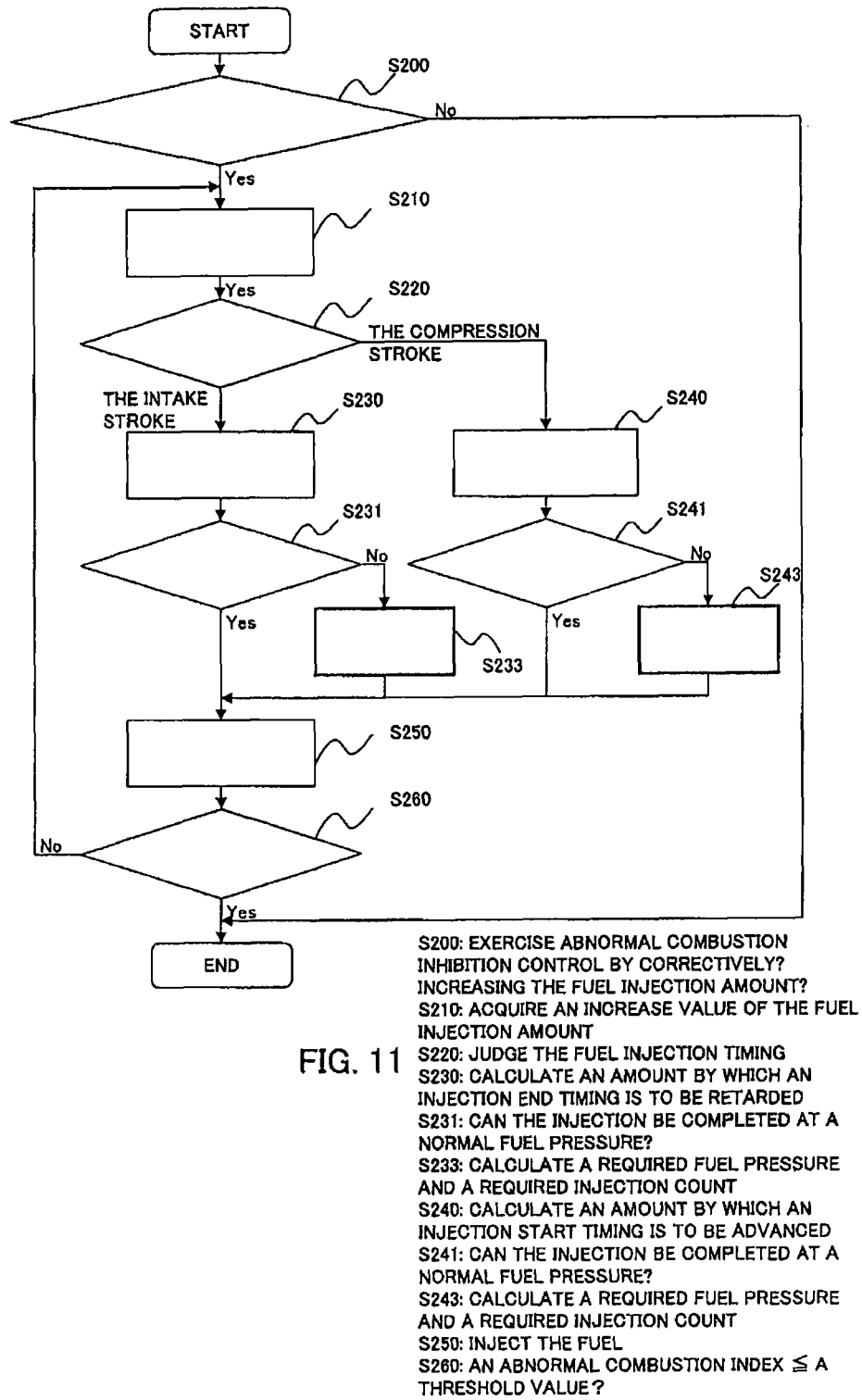

S200: EXERCISE ABNORMAL COMBUSTION INHIBITION CONTROL BY CORRECTIVELY? INCREASING THE FUEL INJECTION AMOUNT?
S210: ACQUIRE AN INCREASE VALUE OF THE FUEL INJECTION AMOUNT
S220: JUDGE THE FUEL INJECTION TIMING
S230: CALCULATE AN AMOUNT BY WHICH AN INJECTION END TIMING IS TO BE RETARDED
S231: CAN THE INJECTION BE COMPLETED AT A NORMAL FUEL PRESSURE?
S233: CALCULATE A REQUIRED FUEL PRESSURE AND A REQUIRED INJECTION COUNT
S240: CALCULATE AN AMOUNT BY WHICH AN INJECTION START TIMING IS TO BE ADVANCED
S241: CAN THE INJECTION BE COMPLETED AT A NORMAL FUEL PRESSURE?
S243: CALCULATE A REQUIRED FUEL PRESSURE AND A REQUIRED INJECTION COUNT
S250: INJECT THE FUEL
S260: AN ABNORMAL COMBUSTION INDEX $\leqq$ A THRESHOLD VALUE?

FIG. 11

CONTROL DEVICE FOR INTERNAL COMBUSTION ENGINE

TECHNICAL FIELD

The present invention relates to a control device for an internal combustion engine, and more particularly to a control device suitable for controlling an internal combustion engine mounted on a vehicle.

BACKGROUND ART

A conventionally known technology disclosed, for instance, in JP-2006-046140-A suppresses the occurrence of an abnormal combustion in a situation where an abnormal combustion, such as pre-ignition (a phenomenon in which combustion is initiated earlier than ignition timing to generate an excessive in-cylinder pressure), might occur in a combustion chamber of an internal combustion engine. When a precursor of pre-ignition is detected, the technology disclosed in JP-2006-046140-A exercises control to suppress the occurrence of pre-ignition by increasing the amount of fuel or retarding the ignition timing.

The applicant of the present invention has acknowledged that the following documents relate to the present invention including the aforementioned document.

PRIOR ART LITERATURE

Patent Documents

Patent Document 1: JP-2006-046140-A
Patent Document 2: JP-1999-050878-A
Patent Document 3: JP-1986-244831-A

SUMMARY OF THE INVENTION

Technical Problem

Incidentally, a catalyst is installed in an exhaust path of the internal combustion engine to purify exhaust. The temperature of the catalyst needs to be promptly raised to its activation temperature so that the catalyst delivers its full-expected purification performance. However, if the catalyst is persistently exposed to an excessively high temperature, it is highly probable that the catalyst may become physically damaged due to the high temperature. Therefore, control needs to be exercised to prevent the catalyst temperature from rising above an upper-limit threshold value. It means that control needs to be exercised to keep the catalyst temperature within an appropriate range. When control is exercised to suppress the occurrence of an abnormal combustion as described above by increasing the amount of fuel or retarding the ignition timing, the catalyst temperature is affected. However, when control is exercised in a conventional manner, the catalyst temperature is not taken into account. Therefore, when control is exercised in the conventional manner to suppress the occurrence of an abnormal combustion, it is anticipated that the catalyst may fail to deliver its full-expected purification performance.

The present invention has been made to solve the above problem. An object of the present invention is to provide a control device for an internal combustion engine that, when an abnormal combustion is detected, is capable of not only exercising control to suppress the occurrence of the abnormal combustion, but also exercising catalyst temperature control to keep the temperature of a catalyst within a range within which the catalyst can deliver its purification performance in a suitable manner.

Solution to Problem

A first aspect of the present invention is a control device for an internal combustion engine, the control device comprising:
 catalyst temperature acquisition means for acquiring a catalyst temperature of a catalyst disposed in an exhaust path of the internal combustion engine;
 abnormal combustion detection means for detecting an abnormal combustion that has occurred in a combustion chamber of the internal combustion engine;
 gas control means for controlling the amount of intake gas flowing into the combustion chamber and a temperature of exhaust gas flowing into the catalyst;
 fuel injection amount control means for controlling the amount of fuel injected into the combustion chamber; and
 abnormal combustion inhibition mode selection means for choosing one of a first mode, a second mode, and a third mode in accordance with the catalyst temperature acquired by the catalyst temperature acquisition means when an abnormal combustion is detected by the abnormal combustion detection means, the first mode causing the gas control means to suppress the occurrence of the abnormal combustion while raising the catalyst temperature, the second mode causing the fuel injection amount control means to suppress the occurrence of the abnormal combustion while inhibiting an increase in the catalyst temperature, the third mode causing the gas control means and the fuel injection amount control means to suppress the occurrence of the abnormal combustion.

A second aspect of the present invention is the control device according to the first aspect,
 wherein the abnormal combustion inhibition mode selection means chooses the first mode if the abnormal combustion detection means detects an abnormal combustion when the catalyst temperature acquired by the catalyst temperature acquisition means is not higher than an activation temperature,
 wherein the abnormal combustion inhibition mode selection means chooses the second mode if the abnormal combustion detection means detects an abnormal combustion when the catalyst temperature acquired by the catalyst temperature acquisition means is not lower than an upper-limit threshold value, which is higher than the activation temperature, and
 wherein the abnormal combustion inhibition mode selection means chooses the third mode if the abnormal combustion detection means detects an abnormal combustion when the catalyst temperature acquired by the catalyst temperature acquisition means is higher than the activation temperature and lower than the upper-limit threshold value.

A third aspect of the present invention is the control device according to the first or the second aspects, further comprising:
 a supercharger having a turbine that is installed in the exhaust path and disposed upstream of the catalyst;
 a bypass path that bypasses the turbine by connecting the exhaust path upstream of the turbine to the exhaust path between the turbine and the catalyst; and a waste gate valve that is capable of opening and closing the bypass path;

wherein the gas control means includes WGV control means for opening the waste gate valve;

wherein the first mode causes the WGV control means to open the waste gate valve;

wherein the second mode causes the fuel injection amount control means to correctively increase a fuel injection amount; and wherein the third mode causes the WGV control means to open the waste gate valve and the fuel injection amount control means to correctively increase the fuel injection amount.

A fourth aspect of the present invention is the control device according to the third aspect, further comprising:

ignition timing control means that is capable of changing ignition timing;

wherein the first mode and the third mode additionally exercise control to cause the ignition timing control means to retard the ignition timing.

A fifth aspect of the present invention is the control device according to the fourth aspect, further comprising:

an intake valve that opens and closes a path between the combustion chamber and an intake path of the internal combustion engine;

an exhaust valve that opens and closes a path between the combustion chamber and the exhaust path; and a variable valve timing device that is capable of changing the valve timing of at least either the intake valve or the exhaust valve;

wherein the first mode and the third mode additionally exercise control to cause the variable valve timing device to increase a valve overlap amount.

Advantageous Effects of Invention

When an abnormal combustion is detected, the first and second aspects of the present invention make it possible not only to exercise control to suppress the occurrence of the abnormal combustion, but also to exercise catalyst temperature control to keep the temperature of the catalyst within a range within which the catalyst can deliver its purification performance in a suitable manner.

The third aspect of the present invention opens the waste gate valve in the first mode. When the waste gate valve opens, high-temperature exhaust bypasses the turbine having a high heat capacity and flows into the catalyst through the bypass path. Hence, the increase in the catalyst temperature can be facilitated during catalyst warm-up. Further, when the waste gate valve opens, a boost pressure decreases to decrease the amount of intake air. Therefore, the occurrence of the abnormal combustion can be suppressed. This makes it possible not only to warm up the catalyst but also to suppress the occurrence of the abnormal combustion.

Furthermore, in the second mode, the amount of fuel injection is correctively increased. When the fuel injection amount is correctively increased, an in-cylinder atmospheric temperature decreases. This makes it possible not only to suppress the occurrence of the abnormal combustion but also to inhibit the increase in the catalyst temperature.

Moreover, in the third mode, the waste gate valve opens and the fuel injection amount is correctively increased. This decreases the intake air amount and lowers the in-cylinder atmospheric temperature. Consequently, the occurrence of the abnormal combustion can be suppressed with increased certainty.

As the first and third modes are additionally capable of exercising control to retard the ignition timing, the fourth aspect of the present invention can further improve fuel efficiency and emissions performance.

As the first and third modes are additionally capable of exercising control to increase the valve overlap amount, the fifth aspect of the present invention can further improve fuel efficiency and emissions performance.

BRIEF DESCRIPTION OF DRAWINGS

FIG. 5 is a flowchart illustrating a control routine that is executed by the ECU 50 according to a second embodiment of the present invention.

FIG. 7 is a flowchart illustrating a control routine that is executed by the ECU 50 according to a third embodiment of the present invention.

FIG. 8 is a flowchart illustrating a control routine that is executed by the ECU 50 according to a forth embodiment of the present invention.

FIG. 9 is a flowchart illustrating a control routine that is executed by the ECU 50 according to a fifth embodiment of the present invention.

FIG. 11 is a flowchart illustrating a control routine that is executed by the ECU 50 according to a sixth embodiment of the present invention.

DESCRIPTION OF EMBODIMENTS

Figure 1:
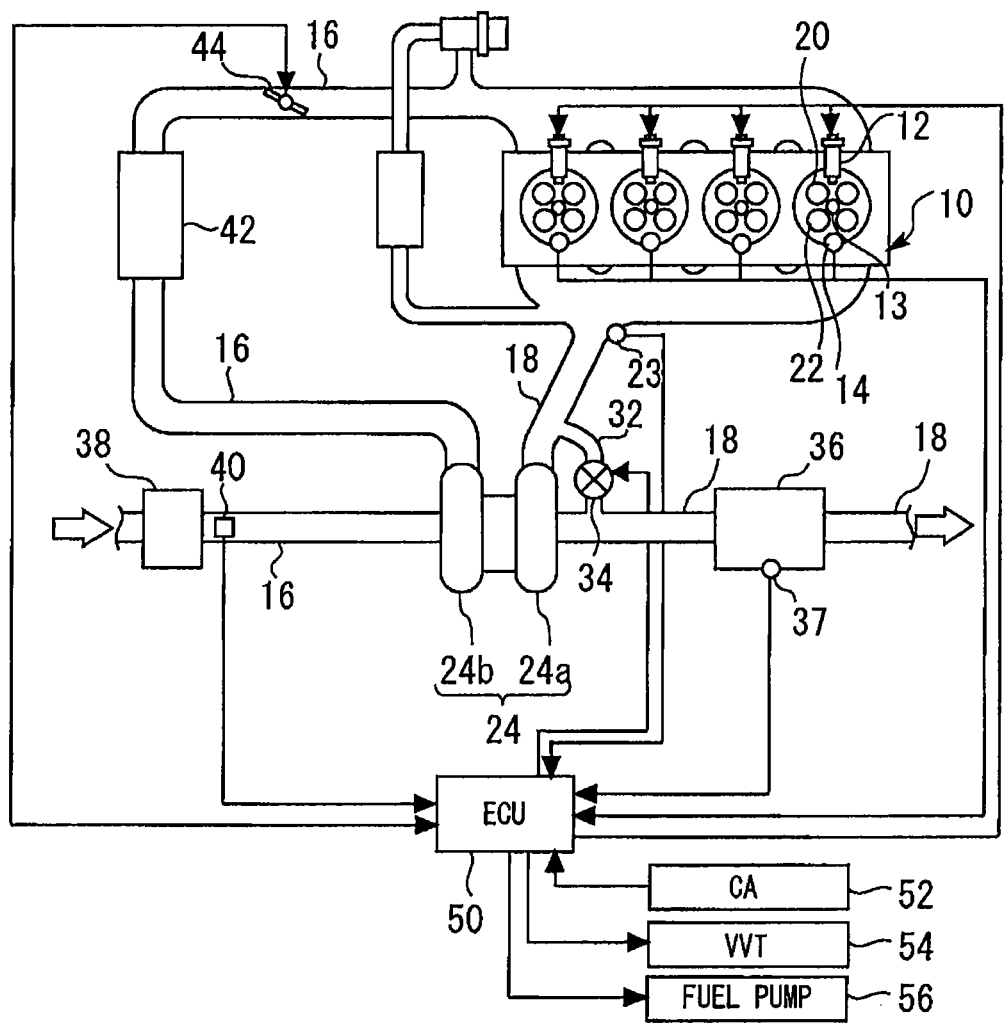
FIG. 1 is a diagram illustrating the configuration of a system according to a first embodiment of the present invention.

Embodiments of the present invention will now be described with reference to the accompanying drawings. Like elements in the drawings are designated by the same reference numerals and will not be redundantly described.

First Embodiment

System Configuration of First Embodiment

FIG. 1 is a diagram illustrating the configuration of a system according to a first embodiment of the present invention. The system shown in FIG. 1 includes an internal combustion engine 10 that is downsized by supercharging. The internal combustion engine 10 is mounted, for instance, on a vehicle and used as a motive power source for the vehicle. The internal combustion engine 10 shown in FIG. 1 is an in-line four-cylinder engine. However, the present invention does not specifically define the number of cylinders or the arrangement of the cylinders.

Each cylinder of the internal combustion engine 10 includes an injector 12 that directly injects fuel into the cylinder (into a combustion chamber), an ignition plug 13 that ignites an air-fuel mixture, and an in-cylinder pressure sensor 14 that outputs a signal in accordance with an in-cylinder pressure.

Each cylinder of the internal combustion engine 10 is connected to an intake path 16 and to an exhaust path 18. An intake valve 20 is disposed at a downstream end of the intake path 16 to open and close a path between the cylinder (combustion chamber) and the intake path 16. An exhaust valve 22 is disposed at an upstream end of the exhaust path 18 to open and close a path between the cylinder (combustion chamber) and the exhaust path 18. An air-fuel ratio sensor 23 is disposed near a joint of the exhaust path 18 to output a signal in accordance with an exhaust air-fuel ratio.

Exhaust gas discharged from each cylinder of the internal combustion engine 10 flows into the exhaust path 18. The internal combustion engine 10 includes a turbocharger 24 that performs supercharging by using the energy of the exhaust gas. The turbocharger 24 includes a turbine 24a, which is rotated by the energy of the exhaust gas, and a compressor 24b, which is rotationally driven by the turbine 24a. The turbine 24a is installed in the exhaust path 18 and disposed downstream of the air-fuel ratio sensor 23. The compressor 24b is disposed in the middle of the intake path 16.

A bypass path 32 is disposed near the turbine 24a. The bypass path 32 bypasses the turbine 24a by connecting the exhaust path 18 near the inlet of the turbine 24a to the exhaust path 18 near the outlet of the turbine 24a. An electronically-controlled waste gate valve (hereinafter referred to as the WGV) 34 is disposed in the bypass path 32 to open and close the bypass path 32 as desired.

Further, a catalyst 36 is installed in the exhaust path 18 that is disposed downstream of the turbine 24a to purify harmful components in the exhaust gas. For example, a three-way catalyst is used as the catalyst 36. A temperature sensor 37 is disposed near the catalyst 36 to output a signal in accordance with the temperature of the catalyst.

An air cleaner 38 is disposed near the inlet of the intake path 16. An air flow meter 40 is disposed near a downstream end of the air cleaner 38 to output a signal in accordance with the flow rate of air taken into the intake path 16. The compressor 24b is disposed downstream of the air flow meter 40. A water-cooled inter-cooler 42 is disposed downstream of the compressor 24b. An electronically-controlled throttle valve 44 is disposed downstream of the inter-cooler 42.

Fresh air taken in through the air cleaner 38 is compressed by the compressor 24b of the turbocharger 24 and then cooled by the inter-cooler 42. The cooled fresh air is passed through the throttle valve 44 and distributed into each cylinder.

The system according to the present embodiment further includes an ECU (electronic control unit) 50. The ECU 50 is formed by an arithmetic processing unit that includes a storage circuit having, for instance, a ROM and a RAM. An input end of the ECU 50 is connected not only to the above-described in-cylinder pressure sensor 14, air-fuel ratio sensor 23, and air flow meter 40, but also to various sensors for detecting the operating status of the internal combustion engine 10, such as a crank angle sensor 52 for detecting a crank angle and a crank angular velocity. An output end of the ECU 50 is connected to various actuators for controlling the operating status of the internal combustion engine 10, such as the above-described injector 12, ignition plug 13, WGV 34, and throttle valve 44.

The ECU 50 is capable of storing various data that varies with the crank angle. The ECU 50 stores such data together with the crank angle as time-series data. The time-series data includes, for instance, various sensor outputs and various indices and parameters that are calculated in accordance with the various sensor outputs.

Figure 2:
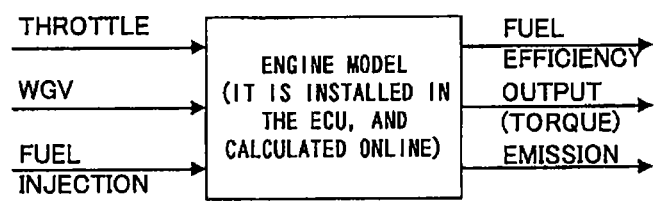
FIG. 2 shows an engine model installed in the ECU 50 according to a first embodiment of the present invention.

An engine model is installed in the ECU 50 to define the relationship between the operation amounts of various actuators, fuel efficiency, output (torque), and emissions. The engine model shown in FIG. 2 is included as an example. The ECU 50 can use the engine model to calculate the operation amounts of various actuators that meet various requirements concerning fuel efficiency, output (torque), and emissions.

The ECU 50 controls the operating status of the internal combustion engine 10 by driving the various actuators in accordance with various sensor outputs and with a predetermined program. For example, the ECU 50 calculates the crank angle and engine speed in accordance with the output of the crank angle sensor 52 and calculates an intake air amount in accordance with the output of the air flow meter 40. The ECU 50 also calculates the load imposed on the engine (load factor) in accordance, for instance, with the intake air amount and engine speed. A fuel injection amount is calculated in accordance with the intake air amount, engine speed or the like. A fuel amount that provides a stoichiometric exhaust air-fuel ratio is set as a basic fuel injection amount. Fuel injection timing and ignition timing are determined in accordance with the crank angle. The injector 12 and the ignition plug 13 are driven when such timings arrive. This makes it possible to burn the air-fuel mixture in the cylinder and operate the internal combustion engine 10.

[Distinctive Control in First Embodiment]

In a supercharged, downsized engine included, for instance, in the system according to the present embodiment, an abnormal combustion (a phenomenon in which combustion is initiated earlier than ignition timing to generate an excessive in-cylinder pressure) is likely to occur in a low-revolution-speed, high-load operating region. As the abnormal combustion causes damage to the internal combustion engine, control needs to be exercised to suppress the occurrence of the abnormal combustion. Control for suppressing the occurrence of the abnormal combustion can be exercised, for instance, by decreasing the intake air amount or by correctively increasing the fuel injection amount. The decrease in the intake air amount and the corrective increase in the fuel injection amount affect the temperature of the catalyst 36. To let the catalyst 36 deliver its purification performance, it is necessary to promptly raise the catalyst temperature to its activation temperature. However, if the catalyst 36 is persistently exposed to an excessively high temperature, it is highly probable that the catalyst 36 may become physically damaged due to the high temperature. Therefore, control needs to be exercised to prevent the catalyst temperature from rising above an upper-limit threshold value. In other words, catalyst temperature control needs to be exercised to keep the catalyst temperature within an appropriate range. Consequently, when the abnormal combustion occurs, it is preferred that control for preventing the occurrence of the abnormal combustion and catalyst temperature control be simultaneously exercised.

Under the above circumstances, the system according to the present embodiment is allowed to choose one of a first mode, a second mode, or a third mode in accordance with the catalyst temperature when the abnormal combustion is detected. In the first mode, gas control means suppresses the occurrence of the abnormal combustion while raising the catalyst temperature. In the second mode, fuel injection amount control means suppresses the occurrence of the abnormal combustion while inhibiting an increase in the catalyst temperature. In the third mode, the gas control means and the fuel injection amount control means suppress the occurrence of the abnormal combustion.

Distinctive control exercised in the system according to the present embodiment will now be outlined. When the abnormal combustion is detected, the ECU 50 chooses one of the first mode, the second mode, or the third mode in accordance with the catalyst temperature and exercises control as described below.

(1) First Mode

When the catalyst temperature is not higher than the activation temperature, the first mode is chosen. In the first mode, at least the WGV 34 opens. When the WGV 34 opens, high-temperature exhaust bypasses the turbine 24a having a high heat capacity and flows into the catalyst 36 through the bypass path 32. Hence, the increase in the catalyst temperature can be facilitated during catalyst warm-up. Further, when the WGV 34 opens, a boost pressure decreases to decrease the intake air amount. Therefore, the occurrence of the abnormal combustion can be suppressed. This makes it possible not only to warm up the catalyst but also to suppress the occurrence of the abnormal combustion.

(2) Second Mode

When the catalyst temperature is not lower than the upper-limit threshold value, which is higher than the activation temperature, the second mode is chosen. In the second mode, the fuel injection amount is correctively increased. Such a corrective increase in the fuel injection amount lowers an in-cylinder atmospheric temperature. This makes it possible not only to suppress the occurrence of the abnormal combustion but also to inhibit the increase in the catalyst temperature.

(3) Third Mode

When the catalyst temperature is higher than the activation temperature and lower than the upper-limit threshold value, the third mode is chosen. In the third mode, at least the WGV 34 opens and the fuel injection amount is correctively increased. This decreases the intake air amount and lowers the in-cylinder atmospheric temperature. Therefore, the occurrence of the abnormal combustion can be suppressed with increased certainty.

Figure 3:
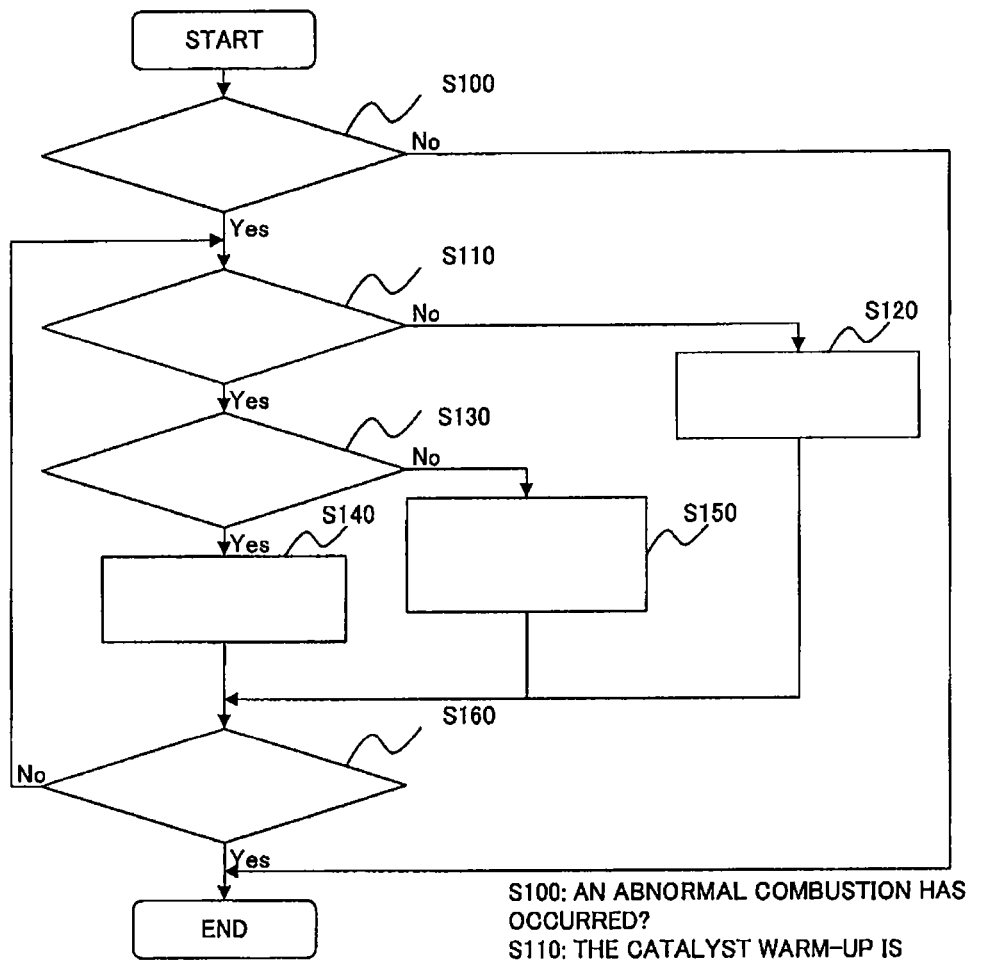
FIG. 3 is a flowchart illustrating a control routine that is executed by the ECU 50 according to a first embodiment of the present invention.

FIG. 3 is a flowchart illustrating a control routine that is executed by the ECU 50 to implement the above operation. The routine is executed, for instance, on every cycle. The routine shown in FIG. 3 first judges whether an abnormal combustion has occurred (step S100). When, for instance, the operating region, which is determined by the engine speed and load factor, is within a low-revolution-speed, high-load, abnormal combustion generating region and the output value of the in-cylinder pressure sensor 14 at a crank angle close to ignition timing is greater than an upper-limit setting for normal combustion, the ECU 50 concludes that the abnormal combustion has occurred in the combustion chamber. If no abnormal combustion has occurred, the routine subsequently terminates its process.

If, on the other hand, the abnormal combustion has occurred, the ECU 50 judges whether catalyst warm-up is completed (step S110). For example, the ECU 50 acquires the catalyst temperature in accordance with a signal output from the temperature sensor 37. If the acquired catalyst temperature has reached the activation temperature, the ECU 50 concludes that catalyst warm-up is completed.

If catalyst warm-up is not completed, the ECU 50 chooses the first mode (step S120). In the first mode, the WGV 34 opens. When the WGV 34 opens, the exhaust gas flows into the catalyst 36 through the bypass path 32. As the exhaust bypasses the turbine 24a having a high heat capacity, the high-temperature exhaust can flow into the catalyst 36. Hence, the catalyst temperature can be raised even when the abnormal combustion occurs during catalyst warm-up. Further, when the WGV 34 opens, the boost pressure decreases to decrease the intake air amount. Therefore, the occurrence of the abnormal combustion can be suppressed. This makes it possible not only to warm up the catalyst but also to suppress the occurrence of the abnormal combustion. In step S120, a required torque is provided by opening the WGV 34 and increasing the degree of opening of the throttle valve 44. In accordance with the engine model, the ECU 50 calculates the degree of throttle valve opening and the degree of WGV opening that provide the request torque.

If, on the other hand, the judgment result obtained in step S110 indicates that catalyst warm-up is completed, the ECU 50 judges whether the catalyst temperature is not lower than the upper-limit threshold value (step S130). The upper-limit threshold value is an upper-limit value for preventing the temperature of the catalyst 36 from excessively rising (OT) and set to a temperature higher than the activation temperature. When the catalyst temperature is not lower than the upper-limit threshold value, the ECU 50 chooses the second mode (step S140). In the second mode, the fuel injection amount is correctively increased. For example, a new fuel injection amount is obtained by adding a correction amount to the basic fuel injection amount, which is based on the load factor, and set as the corrected fuel injection amount. Such a corrective increase in the fuel injection amount lowers the in-cylinder atmospheric temperature. This makes it possible not only to suppress the occurrence of the abnormal combustion but also to inhibit the increase in the catalyst temperature.

If, on the other hand, the judgment result obtained in step S130 indicates that the catalyst temperature is lower than the upper-limit threshold value, the ECU 50 chooses the third mode (step S150). In the third mode, the WGV 34 opens, the degree of opening of the throttle valve 44 increases, and the fuel injection amount increases correctively. As the intake air amount decreases and the in-cylinder atmospheric temperature lowers, the occurrence of the abnormal combustion can be suppressed with increased certainty. More specifically, the ECU 50 uses the engine model shown in FIG. 2 to calculate the combination of the degree of opening of the throttle valve 44, the degree of opening of the WGV 34, and the fuel injection amount that satisfy conditions under which the torque is not lower than a threshold value, the amount of emissions is not larger than a threshold value, and fuel efficiency is maximized. As the catalyst temperature in step S150 is within a preferred range, it need not be raised or suppressed. Therefore, when control is to be exercised to suppress the occurrence of the abnormal combustion, actuator control for fuel efficiency maximization can be selected.

After completion of step S120, S140, or S150, the ECU 50 judges whether an abnormal combustion index is not greater than a threshold value (step S160). The abnormal combustion index is, for example, the number or the frequency of occurrences of the abnormal combustion. If the abnormal combustion index is greater than the threshold value, the ECU 50 repeats steps S110 and beyond. If, on the other hand, the abnormal combustion index is not greater than the threshold value, the routine terminates its process.

As described above, the routine shown in FIG. 3 can choose any of the first mode, the second mode, or the third mode in accordance with the catalyst temperature when the abnormal combustion occurs. Therefore, even when the abnormal combustion is detected, the system according to the present invention can suppress the occurrence of the abnormal combustion while exercising control to keep the catalyst temperature within a suitable range.

In the system according to the first embodiment, which is described above, it is assumed that the catalyst temperature is acquired from the output signal of the temperature sensor 37. However, the present invention is not limited to such a method of catalyst temperature acquisition. For example, the catalyst temperature may be estimated from an operating history of the internal combustion engine 10. This also holds true for other embodiments described later.

Further, in the system according to the first embodiment, which is described above, step S100 is performed to judge, in accordance with the output value of the in-cylinder pressure sensor 14, whether the abnormal combustion has occurred. However, the present invention is not limited to such a method of judgment. For example, an alternative is to provide the internal combustion engine 10 with a knock sensor for detecting the intensity of knocking and, if the operating region is within the abnormal combustion generating region and the intensity of knocking is not lower than a threshold knock value, it may be concluded that the abnormal combustion has occurred. This also holds true for other embodiments described later.

It should also be noted that the present invention is applicable not only to a direct-injection internal combustion engine, but also to a port-injection internal combustion engine having a port injector that port-injects fuel into an intake port and to an internal combustion engine that uses both the injector 12 and the port injector.

In the first embodiment, which is described above, the temperature sensor 37 corresponds to the "catalyst temperature acquisition means" according to the first aspect of the present invention; the WGV 34 and the ECU 50 correspond to the "gas control means" according to the first aspect of the present invention; the injector 12 and the ECU 50 correspond to the "fuel injection amount control means" according to the first aspect of the present invention; the turbine 24a corresponds to the "turbine" according to the third aspect of the present invention; the bypass path 32 corresponds to the "bypass path" according to the third aspect of the present invention; and the WGV 34 corresponds to the "waste gate valve" according to the third aspect of the present invention.

Further, the "abnormal combustion detection means" according to the first aspect of the present invention is implemented when the ECU 50 performs step S100; and the "abnormal combustion inhibition mode selection means" according to the first or second aspect of the present invention is implemented when the ECU 50 performs steps S100 to S150.

Moreover, in the first embodiment, step S120 relates to the "first mode" according to the first aspect of the present invention; step S140 relates to the "second mode" according to the first aspect of the present invention; and step S150 relates to the "third mode" according to the first aspect of the present invention.

Second Embodiment

System Configuration of Second Embodiment

Figure 4:
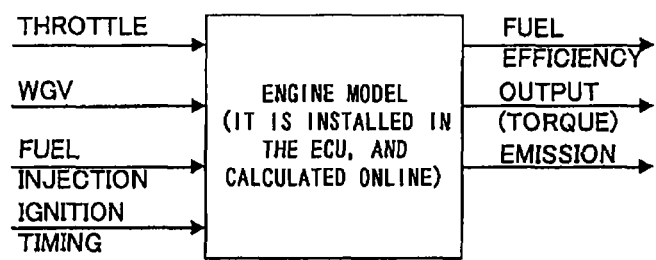
FIG. 4 shows an engine model installed in the ECU 50 according to a second embodiment of the present invention.

A second embodiment of the present invention will now be described with reference to FIGS. 4 and 5. The second embodiment is a modification of the first embodiment. The system according to the second embodiment can be implemented when the system configuration shown in FIG. 1 is employed to let the ECU 50 execute a later-described routine shown in FIG. 5.

The ECU 50 for the system according to the present embodiment includes an ignition timing control device that is capable of changing the ignition timing provided by the ignition plug 13. An engine model is installed in the ECU 50 to define the relationship between the operation amounts of various actuators, fuel efficiency, output (torque), and emissions. The engine model shown in FIG. 4 is included as an example. The ECU 50 can use the engine model to calculate the operation amounts of various actuators that meet various requirements concerning fuel efficiency, output (torque), and emissions.

[Distinctive Control in Second Embodiment]

Distinctive control exercised in the system according to the present embodiment will now be outlined. When the abnormal combustion is detected, the ECU 50 chooses any of the first mode, the second mode, or the third mode in accordance with the catalyst temperature, as is the case with the first embodiment. The system according to the present embodiment is characterized in that ignition retard control is added to abnormal combustion inhibition control exercised in the first and third modes.

FIG. 5 is a flowchart illustrating a control routine that is executed by the ECU 50 in the system according to the present embodiment. This routine is the same as the routine shown in FIG. 3 except that step S120 is replaced by step S121, and that step S150 is replaced by step S151. Steps shown in FIG. 5 and identical with the steps shown in FIG. 3 are designated by the same reference numerals as the corresponding steps and will be briefly described or omitted from the following description.

If the judgment result obtained in step S110 indicates that catalyst warm-up is not completed, the routine shown in FIG. 5 causes the ECU 50 to choose the first mode (step S121). The first mode of the present embodiment opens the WGV 34 and retards the ignition timing. Retarding the ignition timing suppresses the occurrence of the abnormal combustion and raises the catalyst temperature. Consequently, it is possible not only to suppress the occurrence of the abnormal combustion but also to warm up the catalyst.

Further, when the WGV 34 opens, a high-temperature exhaust gas flows into the catalyst 36 to raise the catalyst temperature, as described in connection with the first embodiment. Moreover, when the WGV 34 opens, the boost pressure decreases to decrease the intake air amount. Therefore, the occurrence of the abnormal combustion can be suppressed. This makes it possible not only to warm up the catalyst but also to suppress the occurrence of the abnormal combustion. In step S121, a required torque is provided by opening the WGV 34 and increasing the degree of opening of the throttle valve 44, as is the case with step S120, which is described earlier.

If the judgment result obtained in step S130 indicates that the catalyst temperature is lower than the upper-limit threshold value, the routine shown in FIG. 5 causes the ECU 50 to choose the third mode (step S151). The third mode of the present embodiment opens the WGV 34, increases the degree of opening of the throttle valve 44, correctively increases the fuel injection amount, and retards the ignition timing. As ignition retard control is exercised in addition to the operation performed in step S150 of the first embodiment, the occurrence of the abnormal combustion can be suppressed with increased certainty. More specifically, the ECU 50 uses the engine model shown in FIG. 4 to calculate the combination of the degree of opening of the throttle valve 44, the degree of opening of the WGV 34, the fuel injection amount, and the ignition timing that satisfy conditions under which the torque is not lower than a threshold value, the amount of emissions is not larger than a threshold value, and fuel efficiency is maximized. As the ignition timing is additionally taken into account, the present embodiment can provide higher fuel efficiency and better emissions performance than the first embodiment.

As described above, the routine shown in FIG. 5 can provide increased fuel efficiency and improved emissions performance in addition to the advantages provided by the first embodiment because ignition retard control can be additionally exercised in the first and third modes.

It should also be noted that the present invention is applicable not only to a direct-injection internal combustion engine, but also to a port-injection internal combustion engine having a port injector that port-injects fuel into an intake port and to an internal combustion engine that uses both the injector 12 and the port injector.

In the second embodiment, which is described above, the aforementioned ignition timing control device corresponds to the "ignition timing control means" according to the fourth aspect of the present invention. Further, in the second embodiment, step S121 relates to the "first mode" according to the fourth aspect of the present invention; and step S151 relates to the "third mode" according to the fourth aspect of the present invention.

Third Embodiment

System Configuration of Third Embodiment

Figure 6:
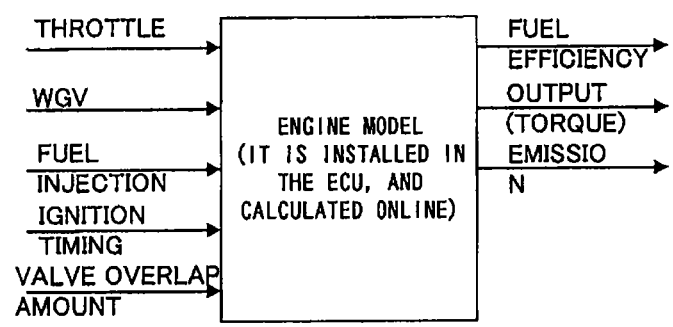
FIG. 6 shows an engine model installed in the ECU 50 according to a third embodiment of the present invention.

A third embodiment of the present invention will now be described with reference to FIGS. 6 and 7. The third embodiment is a modification of the first embodiment. The system according to the third embodiment can be implemented when the system configuration shown in FIG. 1 is employed to let the ECU 50 execute a later-described routine shown in FIG. 7.

The ECU 50 for the system according to the present embodiment includes an ignition timing control device that is capable of changing the ignition timing provided by the ignition plug 13. The inter-cooler 42 includes a cooling water path. The ECU 50 includes a cooling water flow rate control device that is capable of changing the rate of cooling water flow in the cooling water path. An output section of the ECU 50 is connected to a variable valve timing device (hereinafter referred to as the VVT device) 54 that is capable of changing the valve timing of either the intake valve 20 or the exhaust valve 22. Further, an engine model is installed in the ECU 50 to define the relationship between the operation amounts of various actuators, fuel efficiency, output (torque), and emissions. The engine model shown in FIG. 6 is included as an example. The ECU 50 can use the engine model to calculate the operation amounts of various actuators that meet various requirements concerning fuel efficiency, output (torque), and emissions.

[Distinctive Control in Third Embodiment]

Distinctive control exercised in the system according to the present embodiment will now be outlined. When the abnormal combustion is detected, the ECU 50 chooses any of the first mode, the second mode, or the third mode in accordance with the catalyst temperature, as is the case with the second embodiment. The system according to the present embodiment is characterized in that valve overlap amount increase control is added to abnormal combustion inhibition control exercised in the first and third modes, and that cooling water flow rate increase control is added to abnormal combustion inhibition control exercised in the second mode.

FIG. 7 is a flowchart illustrating a control routine that is executed by the ECU 50 in the system according to the present embodiment. This routine is the same as the routine shown in FIG. 5 except that step S121 is replaced by step S122, and that step S140 is replaced by step S142, and further that step S151 is replaced by step S152. Steps shown in FIG. 7 and identical with the steps shown in FIG. 5 are designated by the same reference numerals as the corresponding steps and will be briefly described or omitted from the following description.

If the judgment result obtained in step S110 indicates that catalyst warm-up is not completed, the routine shown in FIG. 7 causes the ECU 50 to choose the first mode (step S122). In the first mode of the present embodiment, the WGV 34 opens, the ignition timing retards, and the VVT device 54 increases a valve overlap amount. When the valve overlap amount increases, the air-fuel mixture blows by to raise the catalyst temperature.

Further, as described in connection with the second embodiment, retarding the ignition timing suppresses the occurrence of the abnormal combustion and raises the catalyst temperature. When the WGV 34 opens, a high-temperature exhaust gas flows into the catalyst 36 to raise the catalyst temperature. Moreover, when the WGV 34 opens, the boost pressure decreases to decrease the intake air amount. Therefore, the occurrence of the abnormal combustion can be suppressed. This makes it possible not only to warm up the catalyst but also to suppress the occurrence of the abnormal combustion. In step S122, a required torque is provided by opening the WGV 34 and increasing the degree of opening of the throttle valve 44, as is the case with step S121, which is described earlier.

If the judgment result obtained in step S130 indicates that the catalyst temperature is not lower than the upper-limit threshold value, the routine shown in FIG. 7 causes the ECU 50 to choose the second mode (step S142). The second mode of the present embodiment correctively increases the fuel injection amount and provides increased cooling efficiency. The cooling efficiency can be increased, for instance, by increasing the rate of cooling water flow in the cooling path that cools the inter-cooler 42. Increasing the cooling efficiency lowers an intake temperature and suppresses the occurrence of the abnormal combustion.

Further, the fuel injection amount is correctively increased, as is the case with step S140, which is described earlier. Such a corrective increase in the fuel injection amount lowers the in-cylinder atmospheric temperature. This makes it possible not only to suppress the occurrence of the abnormal combustion but also to inhibit the increase in the catalyst temperature.

If the judgment result obtained in step S130 indicates that the catalyst temperature is lower than the upper-limit threshold value, the routine shown in FIG. 7 causes the ECU 50 to choose the third mode (step S152). The third mode of the present embodiment opens the WGV 34, increases the degree of opening of the throttle valve 44, correctively increases the fuel injection amount, retards the ignition timing, and increases the valve overlap amount. As valve overlap amount increase control is exercised in addition to the operation performed in step S151 of the second embodiment, the occurrence of the abnormal combustion can be suppressed in a more preferred manner. More specifically, the ECU 50 uses the engine model shown in FIG. 6 to calculate the combination of the degree of opening of the throttle valve 44, the degree of opening of the WGV 34, the fuel injection amount, the ignition timing, and the valve overlap amount that satisfy conditions under which the torque is not lower than a threshold value, the amount of emissions is not larger than a threshold value, and fuel efficiency is maximized. As the valve overlap amount is additionally taken into account, the present embodiment can provide higher fuel efficiency and better emissions performance than the second embodiment.

It should also be noted that the present invention is applicable not only to a direct-injection internal combustion engine, but also to a port-injection internal combustion engine having a port injector that port-injects fuel into an intake port and to an internal combustion engine that uses both the injector 12 and the port injector.

In the third embodiment, which is described above, the aforementioned VVT device 54 corresponds to the "variable valve timing device" according to the fifth aspect of the present invention. Further, in the third embodiment, step S122 relates to the "first mode" according to the fifth aspect of the present invention; and step S152 relates to the "third mode" according to the fifth aspect of the present invention.

Fourth Embodiment

System Configuration of Fourth Embodiment

A fourth embodiment of the present invention will now be described with reference to FIG. 8. The system according to the fourth embodiment can be implemented when the configuration according to any of the first, second, or third embodiment is employed additionally to let the ECU 50 execute a later-described routine shown in FIG. 8.

[Distinctive Control in Fourth Embodiment]

When abnormal combustion inhibition control is exercised in the second mode, the first to third embodiments, which is described earlier, provide abnormal combustion inhibition control by correctively increasing the fuel injection amount (step S140 or S142). However, if an increased portion of fuel adheres to the wall surface of the cylinder, it does not contribute toward decreasing the in-cylinder atmospheric temperature. It is therefore preferred that the fuel be inhibited from adhering to the wall surface. In view of the above circumstances, the system according to the present embodiment injects the fuel under conditions where the fuel does not adhere to the wall surface.

FIG. 8 is a flowchart illustrating a control routine that is executed by the ECU 50 in the system according to the present embodiment. This routine is executed in conjunction with step S140 or S142 in the first to third embodiments.

First of all, the routine shown in FIG. 8 causes the ECU 50 to judge whether the second mode is chosen to exercise abnormal combustion inhibition control by correctively increasing the fuel injection amount (step S200). If the second mode is chosen, a correction amount (increase value) for the basic fuel injection amount, which is based on the load factor, is acquired (step S210). The increase value is calculated in accordance, for instance, with the engine model installed in the ECU 50 or with a map stored in the ECU 50.

Next, the ECU 50 judges whether the fuel injection timing calculated in accordance, for instance, with the engine model installed in the ECU 50 is set in an intake stroke or a compression stroke (step S220). If the fuel injection timing is set in the intake stroke, the ECU 50 calculates an amount by which an injection end timing is to be retarded (step S230). If, on the other hand, the fuel injection timing is set in the compression stroke, the ECU 50 calculates an amount by which an injection start timing is to be advanced (step S240). The ECU 50 correctively increases the fuel injection amount by extending the fuel injection timing in accordance with the retard amount or advance amount calculated in step S230 or S240. Subsequently, the ECU 50 injects the fuel (step S250). The ECU 50 then judges whether the abnormal combustion index is not greater than the threshold value (step S260). The abnormal combustion index is, for example, the number or the frequency of occurrences of the abnormal combustion. If the abnormal combustion index is greater than the threshold value, the ECU 50 repeats steps S210 and beyond. If, on the other hand, the abnormal combustion index is not greater than the threshold value, the routine terminates its process.

As described above, the routine shown in FIG. 8 can correctively increase the fuel injection amount by retarding the injection end timing when the fuel is injected during the intake stroke. During the intake stroke, retarding the injection end timing increases the distance between the injector 12 and a piston. Therefore, the influence of fuel adhering to the wall surface can be reduced by retarding the injection end timing. Further, the routine shown in FIG. 8 can correctively increase the fuel injection amount by advancing the injection start timing when the fuel is injected during the compression stroke. During the compression stroke, advancing the injection start timing increases the distance between the injector 12 and the piston. Therefore, the influence of fuel adhering to the wall surface can be reduced by advancing the injection start timing.

Fifth Embodiment

System Configuration of Fifth Embodiment

A fifth embodiment of the present invention will now be described with reference to FIG. 9. The fifth embodiment is a modification of the fourth embodiment. The system according to the fifth embodiment can be implemented when the configuration according to any of the first, second, or third embodiment is employed additionally to let the ECU 50 execute a later-described routine shown in FIG. 9. It should also be noted that the output section of the ECU 50 is connected to a fuel pump 56 that is capable of changing the pressure of fuel supplied to the injector 12.

[Distinctive Control in Fifth Embodiment]

In the fourth embodiment, which is described earlier, the fuel injection amount is correctively increased by extending a fuel injection period in the direction of either advance or retard. At a normal fuel pressure, however, there may be a case where the injection of a correctively-increased fuel injection amount is not completed within the extended fuel injection period. In such a case, the influence of fuel adhering to the wall surface is great so that the occurrence of the abnormal combustion may not be sufficiently suppressed. As such being the case, the system according to the present embodiment raises the fuel pressure when the injection of a correctively-increased fuel injection amount is not completed within the extended fuel injection period at the normal fuel pressure.

FIG. 9 is a flowchart illustrating a control routine that is executed by the ECU 50 in the system according to the present embodiment. This routine is the same as the routine shown in FIG. 8 except that steps S231 and S232 are performed between steps S230 and S250, and that steps S241 and S242 are performed between steps S240 and S250. Steps shown in FIG. 9 and identical with the steps shown in FIG. 8 are designated by the same reference numerals as the corresponding steps and will be briefly described or omitted from the following description.

Upon completion of step S230, the routine shown in FIG. 9 judges whether the injection of a correctively-increased fuel injection amount can be completed within the fuel injection period extended by retarding the injection end timing (step S231). If the judgment result obtained in step S231 indicates that the injection cannot be completed within the extended fuel injection period at a normal fuel pressure, the ECU 50 calculates a required fuel pressure (step S232). The ECU 50 uses the engine model or the like to calculate the required fuel pressure at which the injection of the correctively-increased fuel injection amount can be completed within the extended fuel injection period, and then controls the fuel pump 56.

Similarly, upon completion of step S240, the routine shown in FIG. 9 judges whether the injection of a correctively-increased fuel injection amount can be completed within the fuel injection period extended by advancing the injection start timing (step S241). If the judgment result obtained in step S241 indicates that the injection cannot be completed within the extended fuel injection period at a normal fuel pressure, the ECU 50 calculates a required fuel pressure (step S242). The ECU 50 uses the engine model or the like to calculate the required fuel pressure at which the injection of the correctively-increased fuel injection amount can be completed within the extended fuel injection period, and then controls the fuel pump 56.

As described above, the routine shown in FIG. 9 not only provides the advantages provided by the fourth embodiment, but also raises the fuel pressure to suppress the occurrence of the abnormal combustion without significantly sacrificing performance even when the abnormal combustion is unavoidable at the normal fuel pressure.

Sixth Embodiment

System Configuration of Sixth Embodiment

Figure 10:
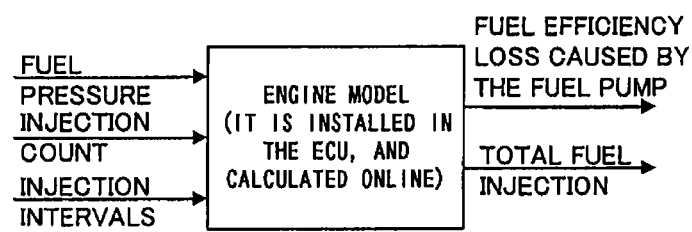
FIG. 10 shows an engine model installed in the ECU 50 according to a sixth embodiment of the present invention.

A sixth embodiment of the present invention will now be described with reference to FIGS. 10 and 11. The sixth embodiment is a modification of the fourth embodiment. The system according to the sixth embodiment can be implemented when the configuration according to any of the first, second, or third embodiment is employed additionally to let the ECU 50 execute a later-described routine shown in FIG. 11.

The output section of the ECU 50 in the system according to the sixth embodiment is connected to the fuel pump 56 that is capable of changing the pressure of fuel supplied to the injector 12. Further, an engine model is installed in the ECU 50 to define the relationship between the operation amounts of various actuators, fuel efficiency loss caused by the fuel pump 56, and a total fuel injection amount of the fuel pump 56. The engine model shown in FIG. 10 is included as an example. The ECU 50 can use the engine model to calculate the operation amounts of various actuators that meet various requirements concerning the fuel efficiency loss caused by the fuel pump 56 and the total fuel injection amount of the fuel pump 56.

[Distinctive Control in Sixth Embodiment]

The fifth embodiment, which is described earlier, not only correctively increases the fuel injection amount by extending the fuel injection period in the direction of either advance or retard, but also raises the fuel pressure as needed. However, there may be a case where the occurrence of the abnormal combustion cannot be sufficiently suppressed by single injection. As such being the case, the system according to the present embodiment not only exercises control to raise the required fuel pressure as described in connection with the fifth embodiment, but also exercises divided injection control.

FIG. 11 is a flowchart illustrating a control routine that is executed by the ECU 50 in the system according to the sixth embodiment. This routine is the same as the routine shown in FIG. 9 except that step S232 is replaced by step S233, and that step S242 is replaced by step S243. Steps shown in FIG. 11 and identical with the steps shown in FIG. 9 are designated by the same reference numerals as the corresponding steps and will be briefly described or omitted from the following description.

If the judgment result obtained in step S231 indicates that the injection of the correctively-increased fuel injection amount cannot be completed within the extended fuel injection period, the routine shown in FIG. 11 causes the ECU 50 to calculate a required fuel pressure and a required injection count (step S233). More specifically, the ECU 50 uses the engine mode shown in FIG. 10 to calculate the combination of the fuel pressure, the injection count, and the injection intervals that minimizes the fuel efficiency loss caused by the fuel pump 56 under conditions where the injection of a correctively-increased total fuel injection amount can be completed within the extended fuel injection period. It should be noted that the ECU 50 also operates as described above in step S243.

As described above, the routine shown in FIG. 11 not only provides the advantages provided by the fifth embodiment, but also exercises divided injection control to suppress the occurrence of the abnormal combustion without significantly sacrificing performance even when the abnormal combustion is unavoidable by performing single injection.

REFERENCE SIGNS LIST

10 internal combustion engine
12 injector
13 ignition plug
14 in-cylinder pressure sensor
16 intake path
18 exhaust path
20 intake valve
22 exhaust valve
23 air-fuel ratio sensor
24 turbocharger
24a turbine
24b compressor
32 bypass path
34 waste gate valve (WGV)
36 catalyst
37 temperature sensor
38 air cleaner
40 air flow meter
42 inter-cooler
44 throttle valve
52 crank angle sensor
50 ECU
54 variable valve timing device (VVT)
56 fuel pump

The invention claimed is:

1. A control device for an internal combustion engine, the control device comprising:
   catalyst temperature acquisition means for acquiring a catalyst temperature of a catalyst disposed in an exhaust path of the internal combustion engine;
   abnormal combustion detection means for detecting an abnormal combustion that has occurred in a combustion chamber of the internal combustion engine;
   gas control means for controlling an amount of intake gas flowing into the combustion chamber and a temperature of exhaust gas flowing into the catalyst;
   fuel injection amount control means for controlling an amount of fuel injected into the combustion chamber; and abnormal combustion inhibition mode selection means for choosing and performing one of a first mode, a second mode, and a third mode when the abnormal combustion is detected by the abnormal combustion detection means, the first mode causing the gas control means to reduce the amount of intake gas and to raise the temperature of exhaust gas when the catalyst temperature is not higher than an activation temperature, the second mode causing the fuel injection amount control means to increase the amount of the fuel when the catalyst temperature is not lower than an upper-limit threshold value which is higher than the activation temperature, and the third mode causing the gas control means to reduce the amount of intake gas and to raise the temperature of exhaust gas and causing the fuel injection amount control means to increase the amount of the fuel when the catalyst temperature is higher than the activation temperature and lower than the upper-limit threshold value.

2. The control device according to claim 1, further comprising:
a supercharger having a turbine that is installed in the exhaust path and disposed upstream of the catalyst;
a bypass path that bypasses the turbine by connecting the exhaust path upstream of the turbine to the exhaust path between the turbine and the catalyst; and
a waste gate valve that is capable of opening and closing the bypass path;
wherein the gas control means includes WGV control means for opening the waste gate valve;
wherein the first mode causes the WGV control means to open the waste gate valve;
wherein the second mode causes the fuel injection amount control means to correctively increase the amount of the fuel; and
wherein the third mode causes the WGV control means to open the waste gate valve and the fuel injection amount control means to correctively increase the amount of the fuel.

3. The control device according to claim 2, further comprising:
ignition timing control means that is capable of changing ignition timing;
wherein the first mode and the third mode additionally exercise control to cause the ignition timing control means to retard the ignition timing.

4. The control device according to claim 3, further comprising:
an intake valve that opens and closes a path between the combustion chamber and an intake path of the internal combustion engine;
an exhaust valve that opens and closes a path between the combustion chamber and the exhaust path; and
a variable valve timing device that is capable of changing the valve timing of at least either the intake valve or the exhaust valve;
wherein the first mode and the third mode additionally exercise control to cause the variable valve timing device to increase a valve overlap amount.

5. An internal combustion engine comprising:
a catalyst disposed in an exhaust path;
a fuel injector to inject fuel into a combustion chamber of the internal combustion engine;
a sensor detecting a combustion state in the combustion chamber of the internal combustion engine;
means for acquiring a catalyst temperature of the catalyst;
gas control means for controlling an amount of intake gas flowing into the combustion chamber and a temperature of exhaust gas flowing into the catalyst; and
a controller controlling the internal combustion engine, the controller programmed to:
(i) detect an abnormal combustion that has occurred in the combustion chamber based on an output from the sensor,
(ii) when the abnormal combustion is detected by the sensor, execute a first mode that causes the gas control means to reduce the amount of intake gas and to raise the temperature of exhaust gas when the catalyst temperature is not higher than an activation temperature,
(iii) when the abnormal combustion is detected by the sensor, execute a second mode that causes the fuel injector to increase the amount of the fuel when the catalyst temperature is not lower than an upper-limit threshold value which is higher than the activation temperature, and
(iv) when the abnormal combustion is detected by the sensor, execute a third mode that causes the gas control means to reduce the amount of intake gas and to raise the temperature of exhaust gas and causes the fuel injector to increase the amount of the fuel when the catalyst temperature is higher than the activation temperature and lower than the upper-limit threshold value.

6. The internal combustion engine according to claim 5, further comprising:
a supercharger having a turbine that is installed in the exhaust path and disposed upstream of the catalyst; and
a bypass path that bypasses the turbine by connecting the exhaust path upstream of the turbine to the exhaust path between the turbine and the catalyst;
wherein the gas control means includes a waste gate valve that is capable of opening and closing the bypass path,
the controller controls the waste gate valve,
the first mode causes the waste gate valve to open;
the second mode causes the fuel injector to increase the amount of the fuel; and
the third mode causes the waste gate valve to open and the fuel injector to increase the amount of the fuel.

7. The internal combustion engine according to claim 5, further comprising:
an ignition plug that ignites an air-fuel mixture in the combustion chamber; wherein
the controller programmed to execute ignition timing control that changes an ignition timing of the ignition plug;
wherein the first mode and the third mode additionally executes control to retard the ignition timing.

8. The internal combustion engine according to claim 5, further comprising:
an intake valve that opens and closes a path between the combustion chamber and an intake path of the internal combustion engine;
an exhaust valve that opens and closes a path between the combustion chamber and the exhaust path; and
a variable valve timing device that is capable of changing the valve timing of at least either the intake valve or the exhaust valve;
wherein the controller controls the variable valve timing device, wherein the first mode and the third mode cause the variable valve timing device to increase a valve overlap amount.

9. A control device for an internal combustion engine, the control device comprising:
a temperature detector to acquire a catalyst temperature of a catalyst disposed in an exhaust path of the internal combustion engine;
a waste gate valve; and
circuitry configured to:
    detect an abnormal combustion that has occurred in a combustion chamber of the internal combustion engine,
    control an amount of intake gas flowing into the combustion chamber and a temperature of exhaust gas flowing into the catalyst,
    control an amount of fuel injected into the combustion chamber, and
    choose and perform one of a first mode, a second mode, and a third mode when the abnormal combustion is detected,
    the first mode causing the waste gate valve to reduce the amount of intake gas and to raise the temperature of exhaust gas when the catalyst temperature is not higher than an activation temperature,
    the second mode increasing the amount of the fuel when the catalyst temperature is not lower than an upper-limit threshold value which is higher than the activation temperature, and
    the third mode causing the waste gate valve to reduce the amount of intake gas and to raise the temperature of exhaust gas and increasing the amount of the fuel when the catalyst temperature is higher than the activation temperature and lower than the upper-limit threshold value.

* * * * *